UNITED STATES PATENT OFFICE 2,245,173

WATER-INSOLUBLE AZO DYE

Werner Zerweck and Wilhelm Kunze, Frankfort-on-the-Main-Fechenheim, Germany, assignors to General Aniline & Film Corporation, a corporation of Delaware No Drawing. Original application May 12, 1937, Serial No. 142,170. Divided and this application June 29, 1939, Serial No. 281,884. In Germany May 15, 1936

1 Claim. (Cl. 260—205)

This application is a division of our copending application Serial No. 142,170, filed May 12, 1937.

The present invention relates to a water insoluble azodyestuff of the formula

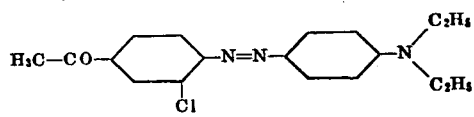

which is obtained by combining diazotized 3-chloro-4-aminoacetophenone with diethylaniline.

The dyestuff thus obtained is especially useful for the dyeing and printing of cellulose esters and ethers, such as for example acetate silk. Advantageously, the dyeing process is performed with the addition of a dispersing agent. The dyeings obtained thereby are distinguished by good fastness properties which are superior to those of similar known dyestuffs.

The invention is illustrated by the following example, the parts being by weight.

Example 172 parts of 3-chloro-4-aminoacetophenone are diazotized in the usual manner, and the diazo solution obtained is combined with a solution of 150 parts of diethylaniline containing hydrochloric acid. The dyestuff formation is completed by the addition of sodium acetate. Then the dyestuff formed is filtered off, washed and dried. It is a red powder and dyes, when mixed with a dispersing agent, acetate silk from a soap-containing bath very strong and clear reddish-orange shades of valuable fastness properties, especially of a very good fastness to light.

We claim:

The azodyestuff of the formula

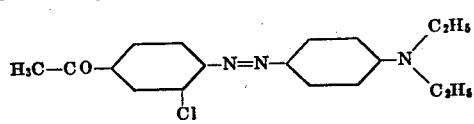

which dyestuff is a red powder, dyeing acetate silk from a soap-containing bath in the presence of a dispersing agent strong and clear reddish-orange shades of valuable fastness properties.

WERNER ZERWECK.
WILHELM KUNZE.